Figure 1:
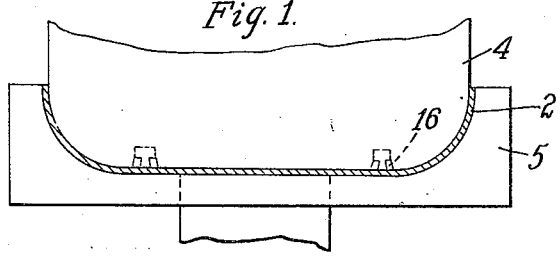

May 12, 1931. K. R. HAMMERSTROM 1,805,283
METHOD OF MANUFACTURING HOLLOW ARTICLES
Filed Nov. 5, 1927  2 Sheets-Sheet 1

INVENTOR.
Karl R. Hammerstrom
BY William B. Jaspert
his ATTORNEYS.

May 12, 1931.     K. R. HAMMERSTROM     1,805,283
METHOD OF MANUFACTURING HOLLOW ARTICLES
Filed Nov. 5, 1927     2 Sheets-Sheet 2
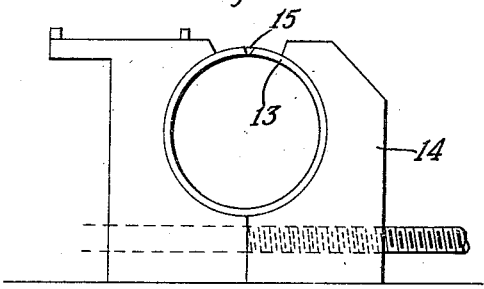
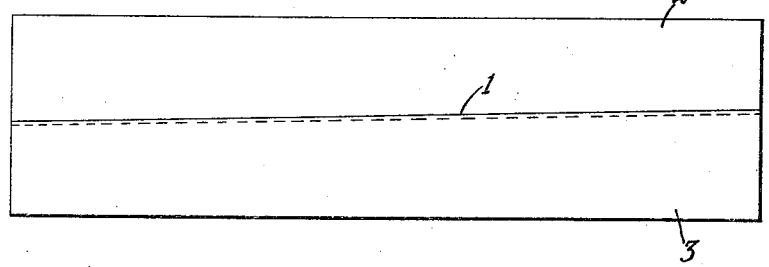
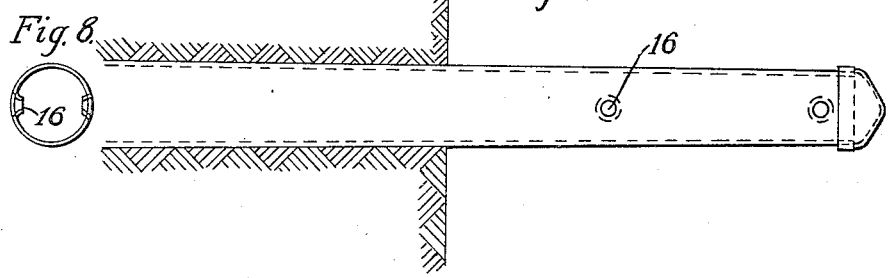
INVENTOR.
Karl R. Hammerstrom
BY William B. Jaspert
his ATTORNEYS.

Patented May 12, 1931

1,805,283

UNITED STATES PATENT OFFICE

KARL R. HAMMERSTROM, OF BUTLER, PENNSYLVANIA

METHOD OF MANUFACTURING HOLLOW ARTICLES

Application filed November 5, 1927. Serial No. 231,376.

This invention relates to a method of manufacturing hollow articles, more particularly tapered hollow articles such as poles, posts, etc., for use as guard rails or wire and cable supports.

It is among the objects of this invention to provide a method of forming hollow tapered poles which shall be relatively inexpensive and economical resulting in a minimum waste of material and which shall permit the use of relatively inexpensive materials for the fabrication of mechanically strong and durable structures.

Another object of the invention is to provide a method of manufacturing hollow tapered poles from flat skelp or sheet material by subjecting the same to a series of die forming operations whereby the geometrical design and desired dimensions of the finished article are formed by the initial steps of the process and maintained throughout the several subsequent steps resulting in a completed article of substantial cylindrical form.

Another object of the invention is the provision of means for joining the formed skelp by welding to produce a seamless article.

These and other objects will become more apparent from a consideration of the drawings hereto attached in which like reference characters designate like parts and in which Figs. 1 to 4 are sectional elevational views of die members illustrating the several steps by which the article is formed; Fig. 5 is an end elevational view of a formed tube assembled in a jig for the purpose of welding the seam; Fig. 6 is a plan view of a sheet of skelp illustrating the manner of forming the blanks; Fig. 7 is a sectional elevational view of a tapered pole formed in accordance with this invention and Fig. 8 is an end elevational view of the pole shown in Fig. 7.

Referring to Fig. 6 of the drawings the blank from which the tapered pole is formed is cut from a strip of sheet metal along the line 1 to form bevel tapered edges on the blanks 2 and 3. The blanks 2 and 3 are cut at an angle corresponding to the degree of taper desired in the hollow article when formed and by so cutting the strip, a pair of symmetrical blanks are formed without any waste.

The blanks are subjected to a series of bending operations as illustrated in Figs. 1 to 4, Fig. 1 illustrating a pair of die members 4 and 5, with the skelp 2 therebetween, the dies being formed to round the edges of the skelp to a radius corresponding to the radius of the finished tube.

Figure 2:
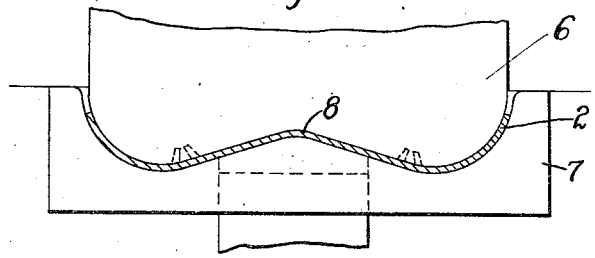
Figure 3:
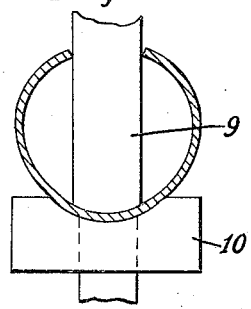

In Fig. 2 a pair of dies 6 and 7 illustrate another method of forming the curved edges of the blank to a radius corresponding to the radius of the finished tube. The dies 9 and 10 shown in Fig. 3 act upon the design made in Fig. 2 to bring the ends or edges of the skelp inwardly by displacing the center portion 8, and Fig. 4 shows a pair of finishing dies of the shape of the finished tube which act upon the design formed by the dies in Fig. 3 to bring the edges of the skelp in substantial abutment.

Figure 4:
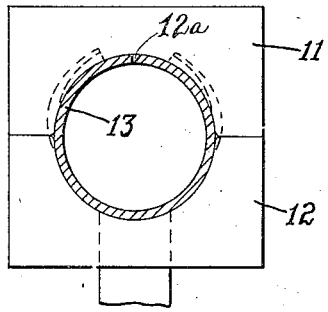

It will be noted that the bevel edge of the blank when joined with the straight edge in the manner shown in Fig. 4, provides a recess 12a along which the tube is welded without requiring any operation, whatsoever, in preparation for welding which is accomplished by pressing the finished tube 13 in a clamping jig 14 to hold the same in its proper position for welding. The welding of the seam 15 may be accomplished by the use of any of the well known processes but the tapered tubes are of a nature which lend themselves to automatic electric welding processes in which a fusible electrode is automatically fed along the seam of the tube by passing the latter under the welding arc.

Again referring to Figs. 1 to 4 inclusive, of the drawings, it will be noted that the gradual formation of the tubular structure from the flat skelp is effected by a straight line movement of the die element whereby the uniformity of the wall section of the skelp is maintained throughout, resulting in the elimination of any waste whatsoever.

As shown in Figs. 1 and 2 the blank prior to the die forming operations may be perforated as at 16 to provide openings or perforations in the finished tube as shown in Figs. 7 and 8. The perforations are formed by upstrike portions which are raised by a pushing operation.

Tapered poles or posts formed in accordance with the present invention are practical, durable and adapted to resist great stresses and may be successfully employed as guard rails or wire and cable supports and many other kindred uses because of their relatively inexpensive construction.

Although but one embodiment of this invention has been herein set forth, it will be obvious to those skilled in the art that modifications may be made without departing from the principles thereof.

I claim:

1. The method of forming tapered hollow articles which comprises forming a blank by cutting skelp of rectangular shape at an angle along one side thereof, the angle corresponding to the degree of taper desired in the hollow article and subjecting the blank so made to a series of die pressing operations to form a cylindrical structure with the edges of the skelp in substantial abutment.

2. The method of forming tapered tubular structures as set forth in claim 1, in which the blank is cut with a beveled edge and in which the tapered tubular structure is joined at the edges by welding.

3. The method of forming hollow tapered articles which comprises cutting a rectangular strip of sheet metal having parallel edges to form a pair of blanks having one longitudinal edge at an oblique angle with its other longitudinal edge and subjecting each of the blanks, so formed, to a series of die-pressing operations to form a tubular structure, having the edges of the blank in substantial abutment.

In testimony whereof, I have hereunto set my hand.

KARL R. HAMMERSTROM.